US006283394B1

(12) United States Patent
Ryen (10) Patent No.: US 6,283,394 B1
(45) Date of Patent: Sep. 4, 2001

(54) GRAVITY OPERATED FISHING REEL BRAKE

(76) Inventor: Hirsh E. Ryen, 8590 Sunrise Lakes Blvd., Bldg. 48, Apt. 306, Sunrise, FL (US) 33322

( * ) Notice: Subject to any disclaimer, the term of this patent is extended or adjusted under 35 U.S.C. 154(b) by 0 days.

(21) Appl. No.: 09/441,084

(22) Filed: Nov. 16, 1999

(51) Int. Cl.$^7$ .................................................. A01K 89/02
(52) U.S. Cl. ......................................... 242/287; 242/290
(58) Field of Search .................................... 242/243, 285, 242/286, 287, 290, 291, 309

(56) References Cited

U.S. PATENT DOCUMENTS

| | | | | |
|---|---|---|---|---|
| 2,059,519 | * | 11/1936 | Harris | 242/287 |
| 2,261,610 | * | 11/1941 | Yarosz | 242/287 |
| 2,374,551 | * | 4/1945 | Margis, Jr. | 242/287 |
| 2,527,131 | * | 10/1950 | Honeycutt, Sr. | 242/287 |
| 2,658,696 | * | 11/1953 | Cooper | 242/287 |
| 2,672,302 | * | 3/1954 | Magee | 242/287 |
| 2,753,129 | * | 7/1956 | Martin | 242/287 |
| 3,319,903 | * | 5/1967 | Mosier | 242/287 |
| 3,510,084 | * | 5/1970 | Andrew | 242/287 |
| 3,532,228 | * | 10/1970 | Cicco | 242/287 |
| 4,117,990 | * | 10/1978 | Denny | 242/287 |
| 5,289,992 | * | 3/1994 | Du Plessis et al. | 242/287 |

* cited by examiner

Primary Examiner—Emmanuel M. Marcelo
(74) Attorney, Agent, or Firm—John C. Smith (57) ABSTRACT

An automatic gravity controlled fishing line brake which is automatically activated when the fishing line goes slack. The fishing line is fed through an opening in an arm of the brake assembly. When the line is taught, such as when it is being cast or when a fish strikes, the tension on the line is used to elevate the arm and disengage the brake. When the fishing line tension is relieved, such as when the line hits the water or when a fish changes direction, gravity automatically lowers the arm and engages the brake on the fishing reel line spool. The brake pads prevent the fishing line spool from rotating and thus prevent the unraveling of fishing line.

11 Claims, 15 Drawing Sheets

Figure 1

Prior Art

Figure 2

Prior Art

Figure 3

Prior Art

Figure 4

Prior Art

GRAVITY OPERATED FISHING REEL BRAKE

BACKGROUND OF THE INVENTION

1. Technical Field

The present invention relates to reels for fishing rods. In particular, it relates to fishing rod reels with gravity controlled brake assemblies that are automatically activated when a fishing line becomes slack.

2. Background Art

An annoying problem which confronts many fishermen is the unraveling of the fishing line spool when a fishing line which is rapidly being unwound under force suddenly loses that force when the line goes slack. For example, when a fishermen is casting a line, or when a fish strikes the line, the line is subjected to force which causes the fishing reel to unwind rapidly. When this happens, the spool holding the supply of fishing line spins rapidly to release extra line. Reels are designed to allow the spool to rapidly release fishing line so as not to reduce the distance for casting or to interfere with hooking the fish.

When the fishing line strikes the water after being cast, or when a fish changes direction, the fishing line may suddenly go slack. Even though the force pulling on the line is removed, the spool will continue to spin. This unnecessary spinning of the reel causes the fishing line to unravel and create a "bird's nest" within the reel assembly. When this happens, the fisherman is inconvenienced by having to rewind the spool to eliminate the bird's nest.

In some prior art fishing reels, a manual brake assembly is provided. The disadvantage associated with manual brake assemblies is that they require a high-level of skill on the part of the fisherman. The fisherman's timing must be precise to avoid prematurely braking the line too early and interfering with the casting or hooking the fish, or alternatively, to avoid braking the line too late which results in the creation of a bird's nest.

Attempts to correct this problem have resulted in the development of tension and centrifugal brakes. Tension brakes reduce the ability of the spool holding the fishing line to unravel which results in a reduced bird's nest problem. However, maintaining tension on the fishing line reduces performance by limiting casting distance. It would be advantageous to have a fishing line brake that does not maintain tension on the fishing line at all times.

Centrifugal brakes attempt to overcome this problem by only engaging the brake when the centrifugal clutch is engaged. While centrifugal brakes help to eliminate this problem, they also have significant drawbacks due to their complexity and cost. In addition, they add increased weight due to the number of components needed to effectuate this type of brake assembly.

While addressing the basic desirability of braking fishing lines with proper timing, the prior art has failed to provide a fishing line brake which is inexpensive to manufacture, which has a minimum number of components, which has a low weight, and which minimizes cost.

SUMMARY OF THE INVENTION

The present invention solves the foregoing problems by providing a low-cost, simple gravity brake which is automatically activated when the fishing line goes slack. The fishing line is fed through an opening in an arm of the brake assembly. When the line is taught, such as when it is being cast or when a fish strikes, the tension on the line is used to elevate the arm and disengage the brake. When the fishing line tension is relieved, such as when the line hits the water or when a fish changes direction, gravity automatically lowers the arm and engages the brake on the fishing reel line spool. The brake pads prevent the fishing line spool from rotating and thus prevent the unraveling of fishing line.

DESCRIPTION OF THE PREFERRED EMBODIMENT

Figure 1:
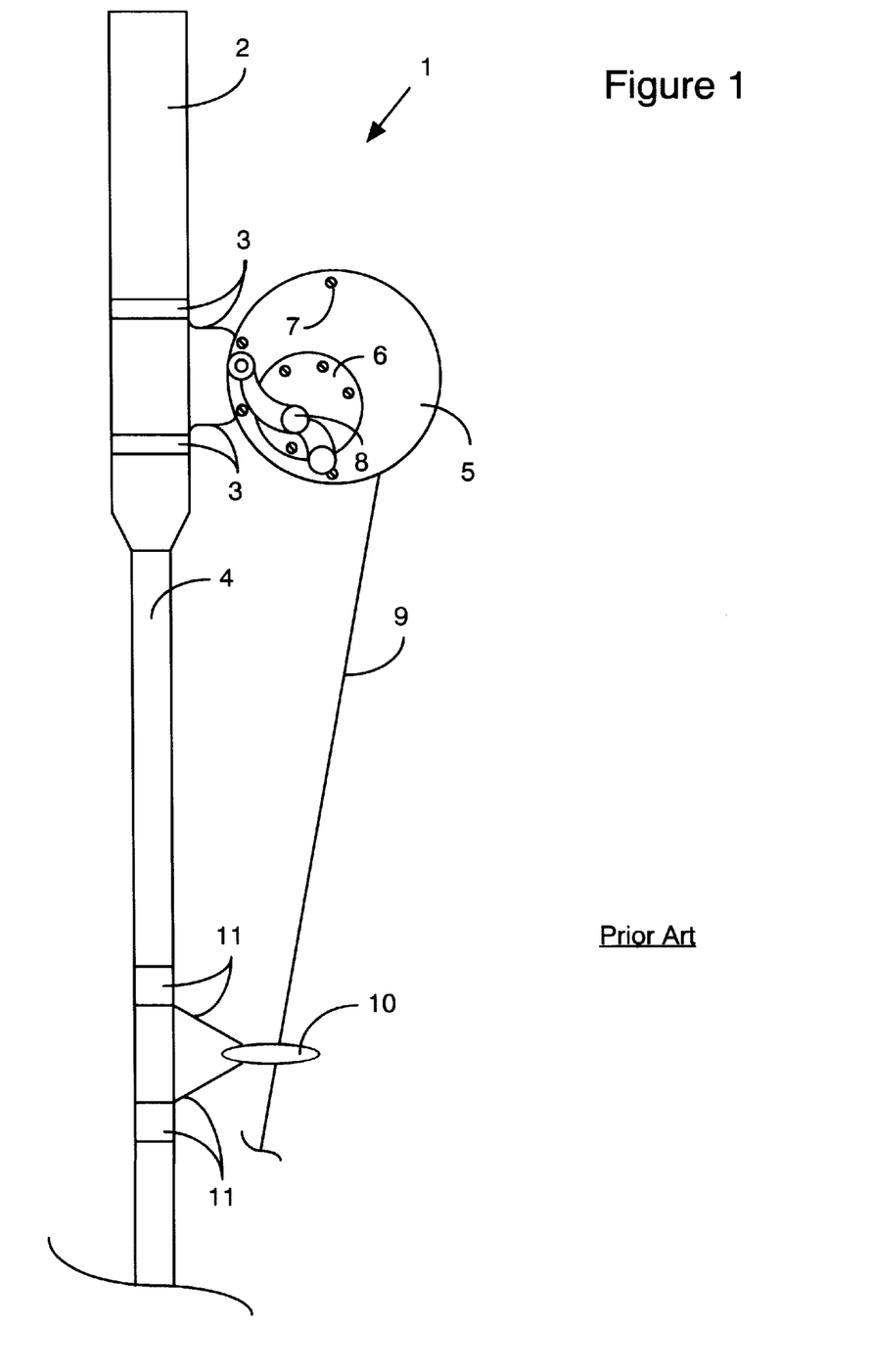
FIG. 1 is a side view of a prior art fishing rod showing the fishing line under tension and extending from the fishing reel.

Referring 2 FIG. 1, this figure illustrates a typical prior art fishing rod 1. The fishing rod 1 is comprised of the handle 2, and a flexible rod section 4 attached to the handle to. A fishing line guide 10 is connected to the flexible rod section 4 via fishing line guide bracket 11. Also shown is a fishing reel assembly that is mounted on the fishing rod 1. The fishing reel assembly includes a fishing reel bracket 3, opposing fishing reel side walls 5 (only one is shown in this figure), a fishing line winding assembly 6 and a fishing line winding crank 8. The opposing fishing reel side walls 5 are secured by screws 7.

This figure also shows a fishing line 9 extending from the fishing reel through the fishing line guide 10. In this figure, the fishing line 9 is shown as a straight line 2 indicate that it is under tension.

Figure 2:
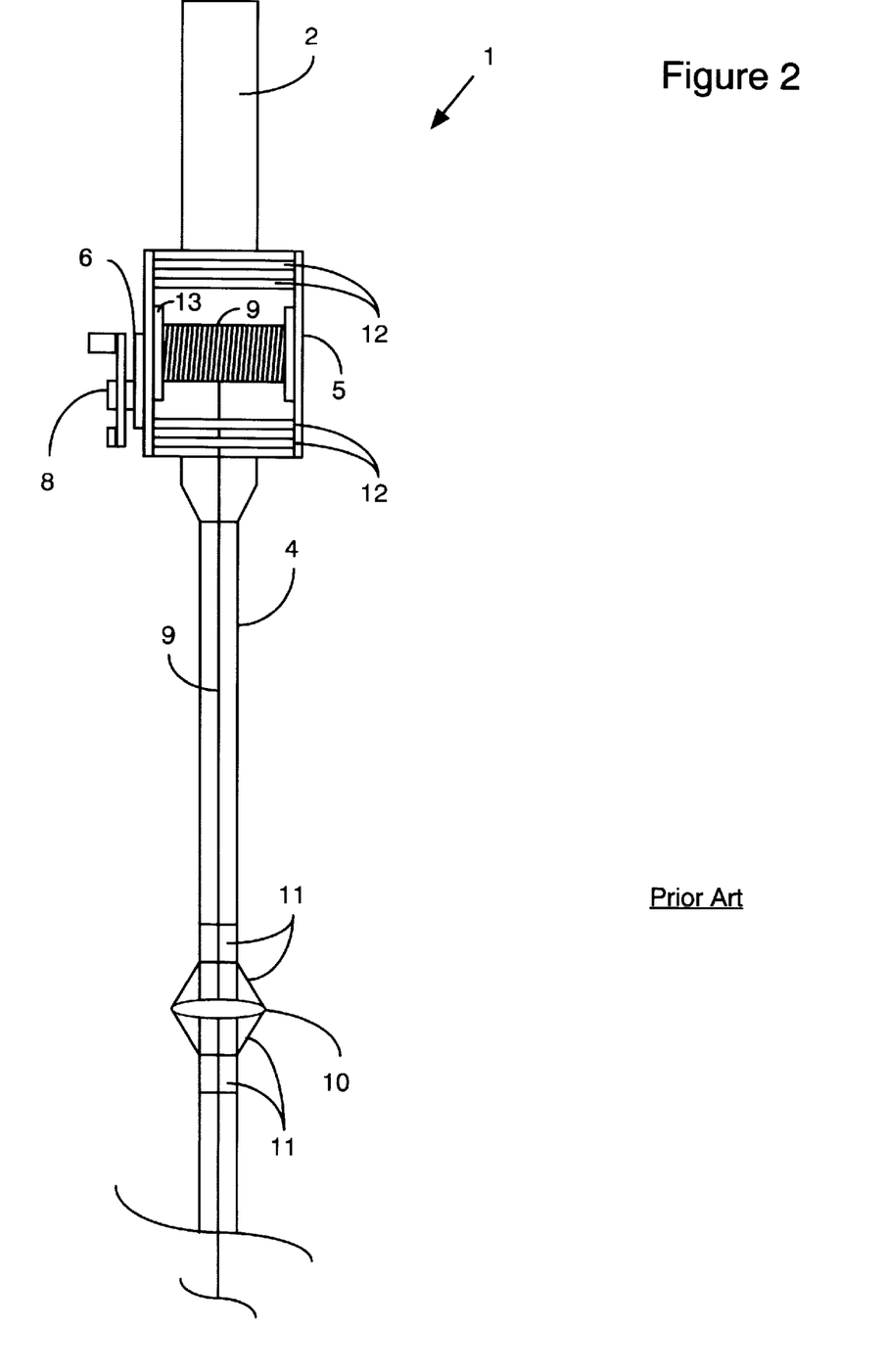
FIG. 2 is a top view of a prior art fishing rod, as shown in FIG. 1, in which the fishing line extends from the fishing reel under tension.

In FIG. 2, a top view of the prior art fishing rod 1 of FIG. 2 is illustrated. This figure illustrates the opposing fishing reel side walls 5 being separated from one another by spacing rods 12. Also shown in this figure is the fishing reel spool 13 which holds a supply of fishing line 9. As was the case in the previous figure, the fishing line 9 is illustrated as a straight line to indicate that it is under tension.

The fishing line 9 will remain under tension while the fishing line is being cast, or while a fish is pulling on the line. Due to the tension, the fishing line 9 is not unraveled from the fishing reel spool 13.

Figure 3:
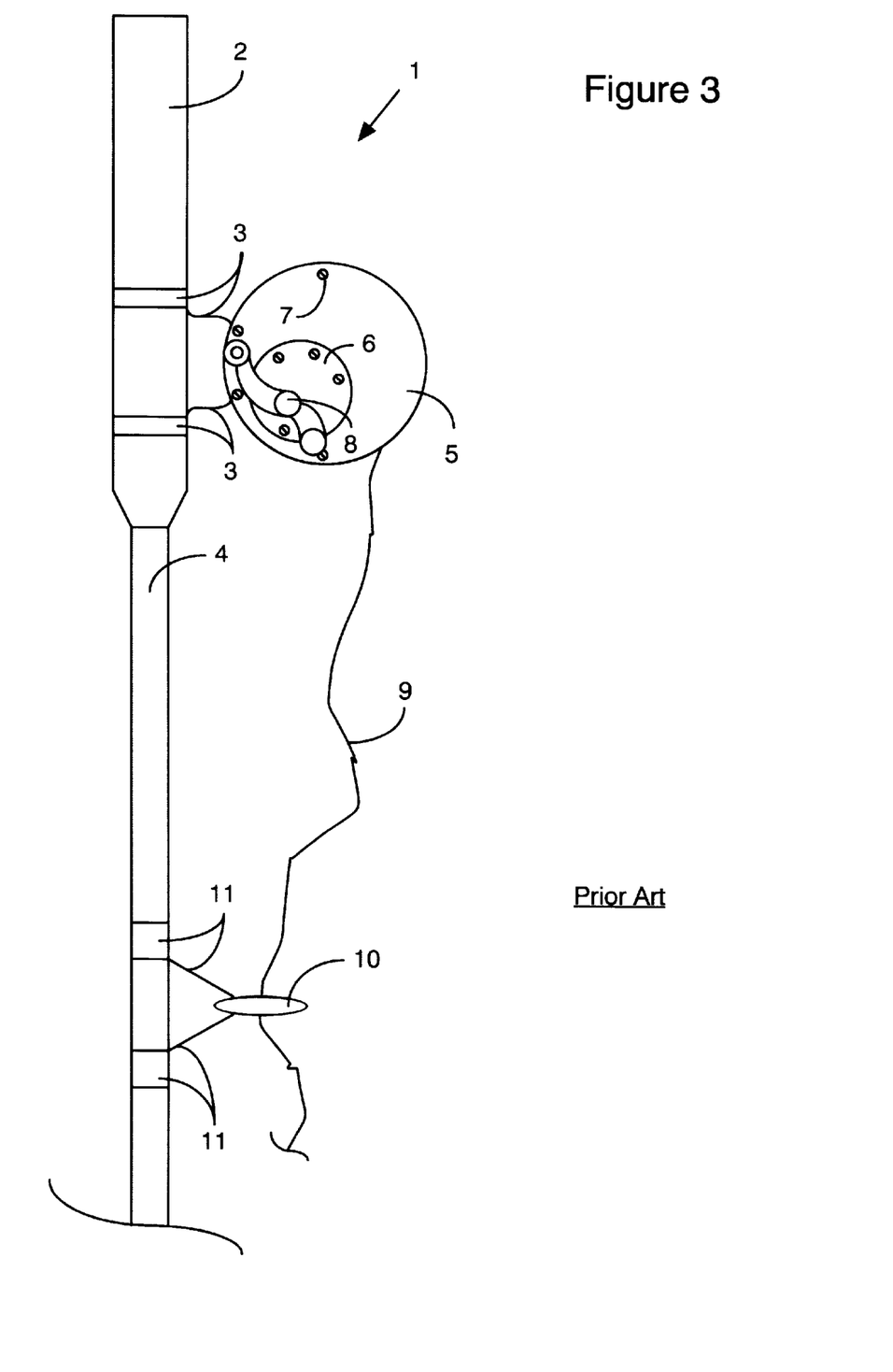
FIG. 3 is a side view of a prior art fishing rod, as shown in FIG. 1, in which the fishing line extends from the fishing reel and is not under tension.

FIG. 3 illustrates a side view of the prior art fishing rod 1 after tension is removed from the fishing line 9. When this happens, the fishing line goes slack and stops moving forward through the fishing line guides 10. Unfortunately, the fishing reel spool 13 continues to spin and begins to unravel the fishing line 9 from the fishing reel spool 13.

Tension is lost when the fishing line 9 hits the water and slows down as its sinks more slowly through the water than it flew through the air. Likewise, if a fish is hooked and swims away, the fishing line 9 will remain under tension. However, if the fish changes direction, tension may be lost and the fishing line 9 will go slack.

Figure 4:
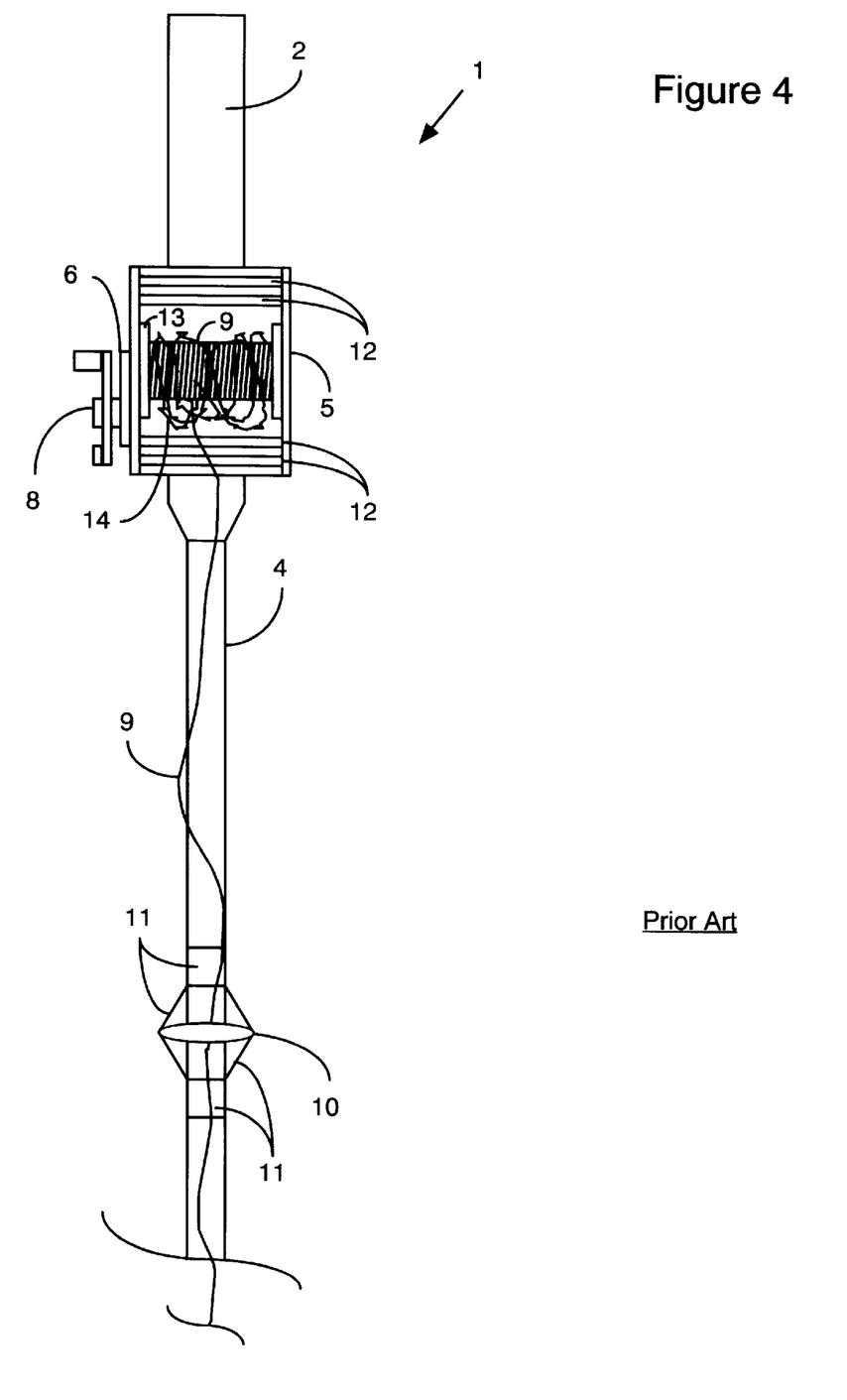
FIG. 4 is a top view of a prior art fishing rod, as shown in FIG. 1, in which fishing line extends from the fishing reel and is not under tension. This figure also illustrates the formation of a bird's nest due to unraveling of the fishing line on the fishing reel spool.

FIG. 4 illustrates the problems caused by lack of tension on fishing line 9. When the fishing line 9 goes slack, it ceases to move in a forward direction away from the fishing reel. However, if the spool 13 was spinning as a result of being cast, or as a result of a fish pulling the fishing line 9, the spool 13 will continue to spin thereby unraveling in the fishing line 9. As the fishing line 9 unravels, it will remain in the fishing reel and form what is commonly termed a "bird's nest" 14.

The formation of a bird's nest is annoying to fishermen because it interrupts the fishing. When the bird's nest is formed, the fisherman must stop fishing to unravel the bird's nest and rewind the fishing line 9.

Figure 5:
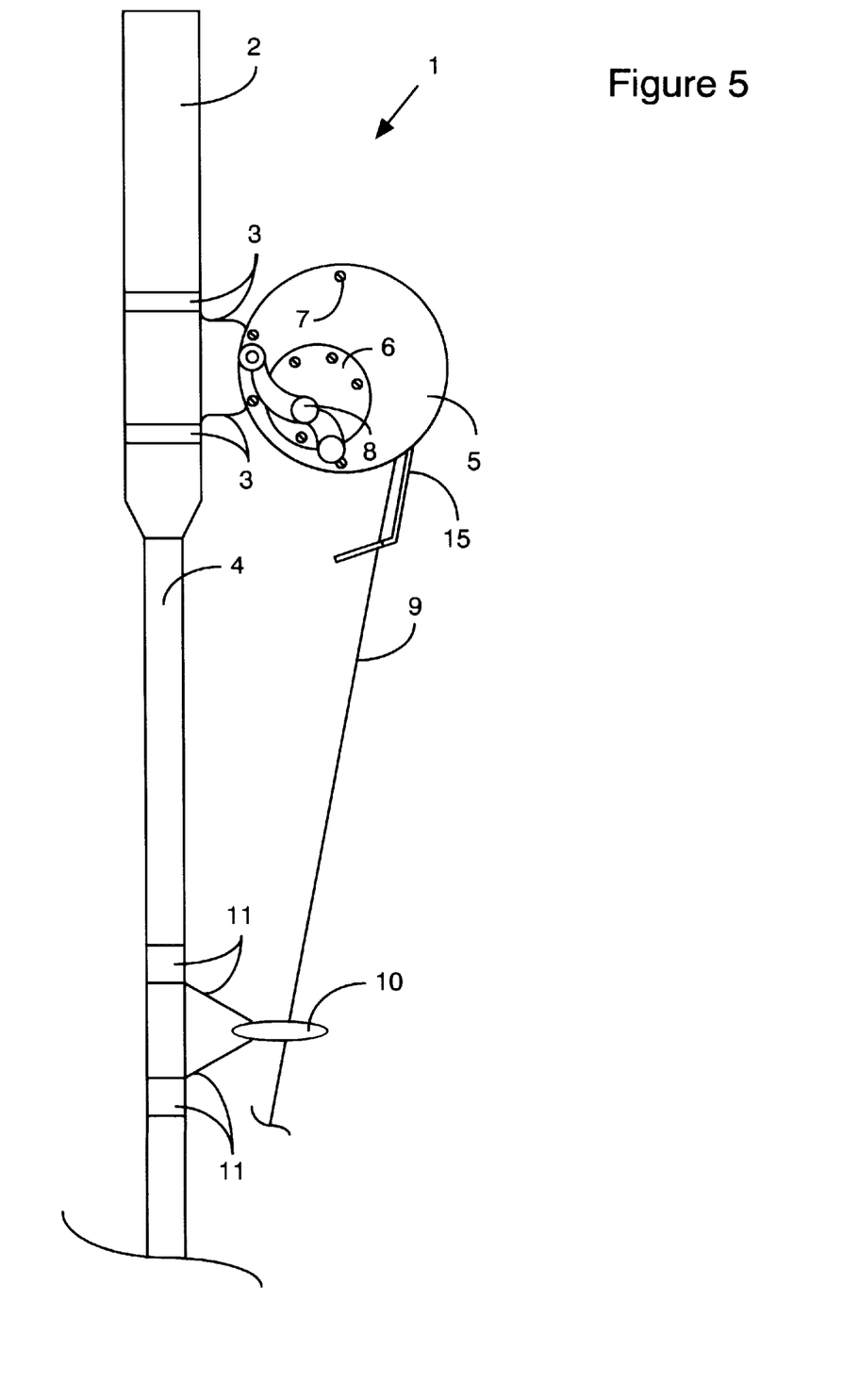
FIG. 5 is a side view of a preferred embodiment of the invention in which the fishing line extends from the fishing reel spool through a gravity controlled fishing line brake under tension.

FIG. 5 shows a preferred embodiment of the invention in which a gravity controlled fishing line brake is installed in the fishing reel. The fishing line brake automatically locks the fishing reel spool 13 when the fishing line 9 goes slack. As a result, this invention provides a substantial improvement in convenience for fishermen because it eliminates the formation of bird's nests and eliminates the work associated with unraveling them which the fisherman would normally be burdened with.

This figure illustrates the fishing line 9 line under tension such as that which would be caused by casting the fishing line 9. When the fishing line 9 is under tension, it pushes against the brake arm 15 and raises it up and away from the flexible rod 4.

Figure 6:
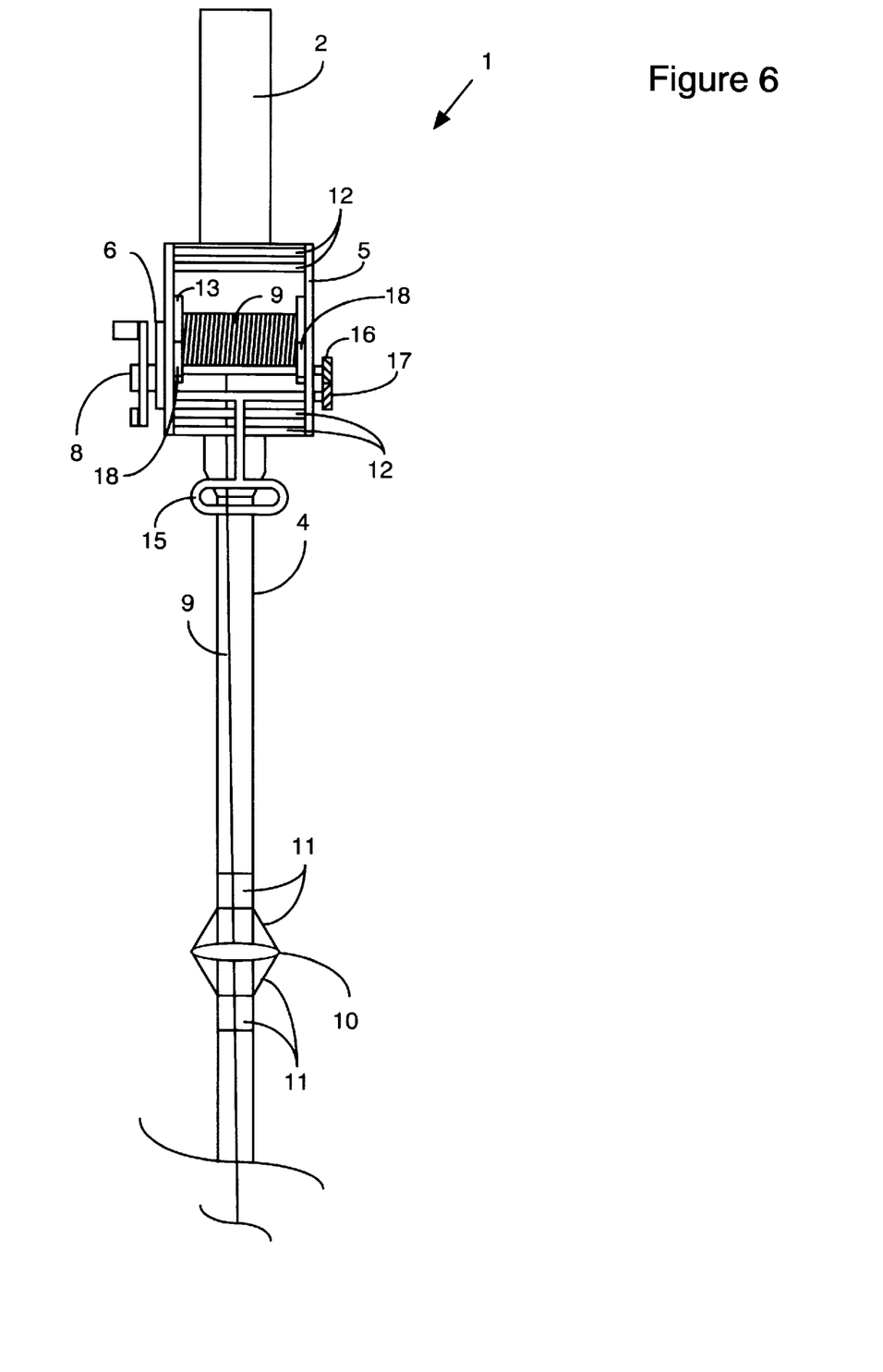
FIG. 6 is a top view of the preferred embodiment of FIG. 5 in which the fishing line extends from the fishing reel spool through a gravity controlled fishing line brake under tension.

FIG. 6 is a top view of the embodiment of FIG. 5. This can be seen in this figure the brake arm 15 is attached to a gear 17. When the brake arm 15 is raised under tension from fishing line 9, the gear 17 rotates. Gear 17 is intermeshed with gear 16 which is in turn attached to brake pads 18. As gear 16 rotates under control of gear 17, the brake pads 18 are rotated up and away from fishing reel spool 13. As a result, when the fishing line 9 is under tension, it forces the brake arm 15 up which in turn forces the brake pads 18 up and away from the fishing reel spool 13. This allows the fishing reel spool 13 to spin freely.

Figure 7:
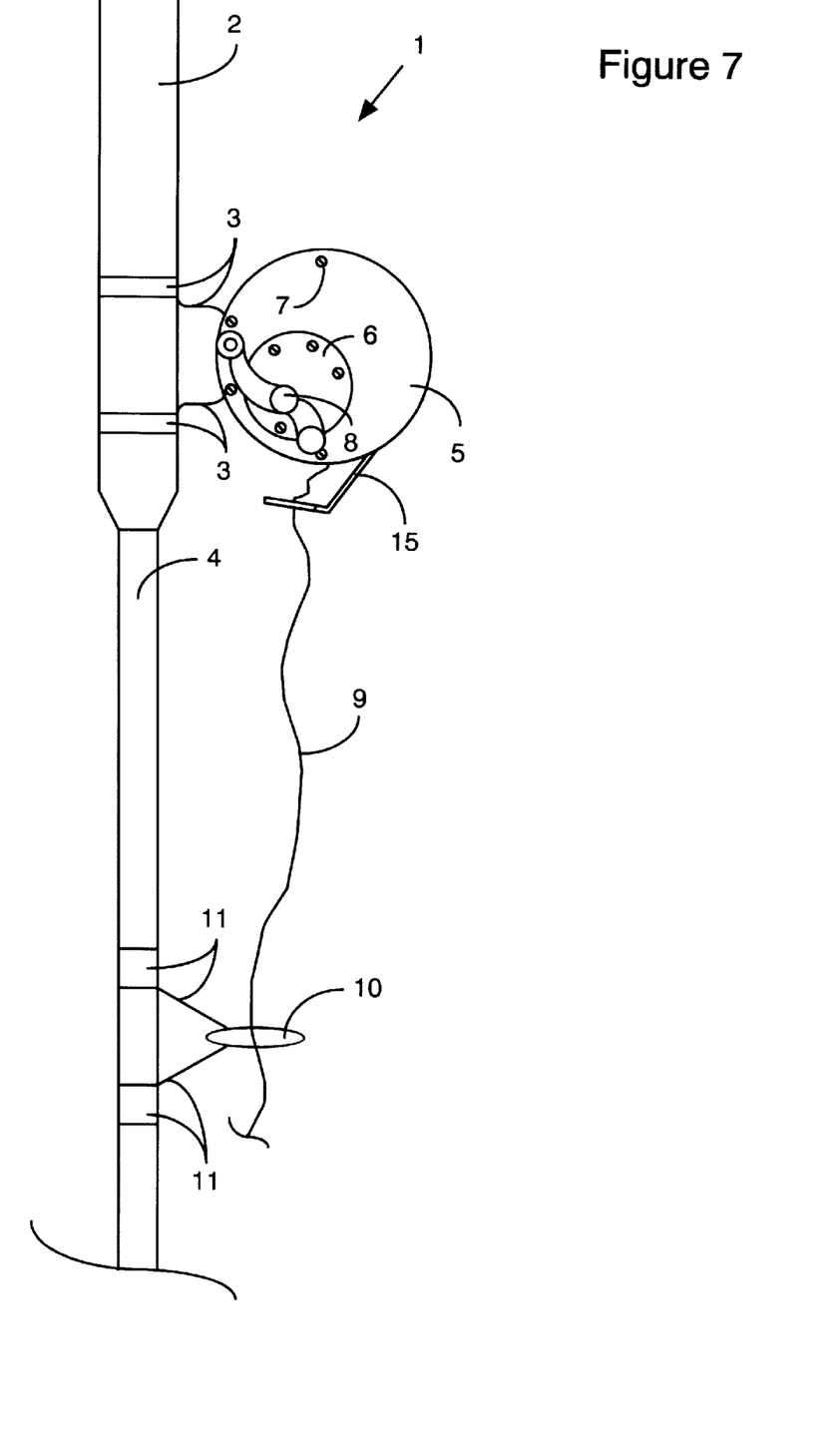
FIG. 7 is a side view of the preferred embodiment of FIG. 5 in which the fishing line extends from the fishing reel spool through a gravity controlled fishing line brake. The line in this figure is slack.

FIG. 7 is a side view of the embodiment to FIG. 5, except that in this view the fishing line 9 is not under tension and is slack. When the fishing line 9 becomes slack, it no longer provides tension to overcome the force of gravity and the brake arm 15 will move downward automatically under the force of gravity toward flexible rod 4. Those skilled in the art will recognize that it is intended that when casting, the fishing reel should be substantially above the flexible rod 4 when the fishing rod 1 is in a horizontal position.

Figure 8:
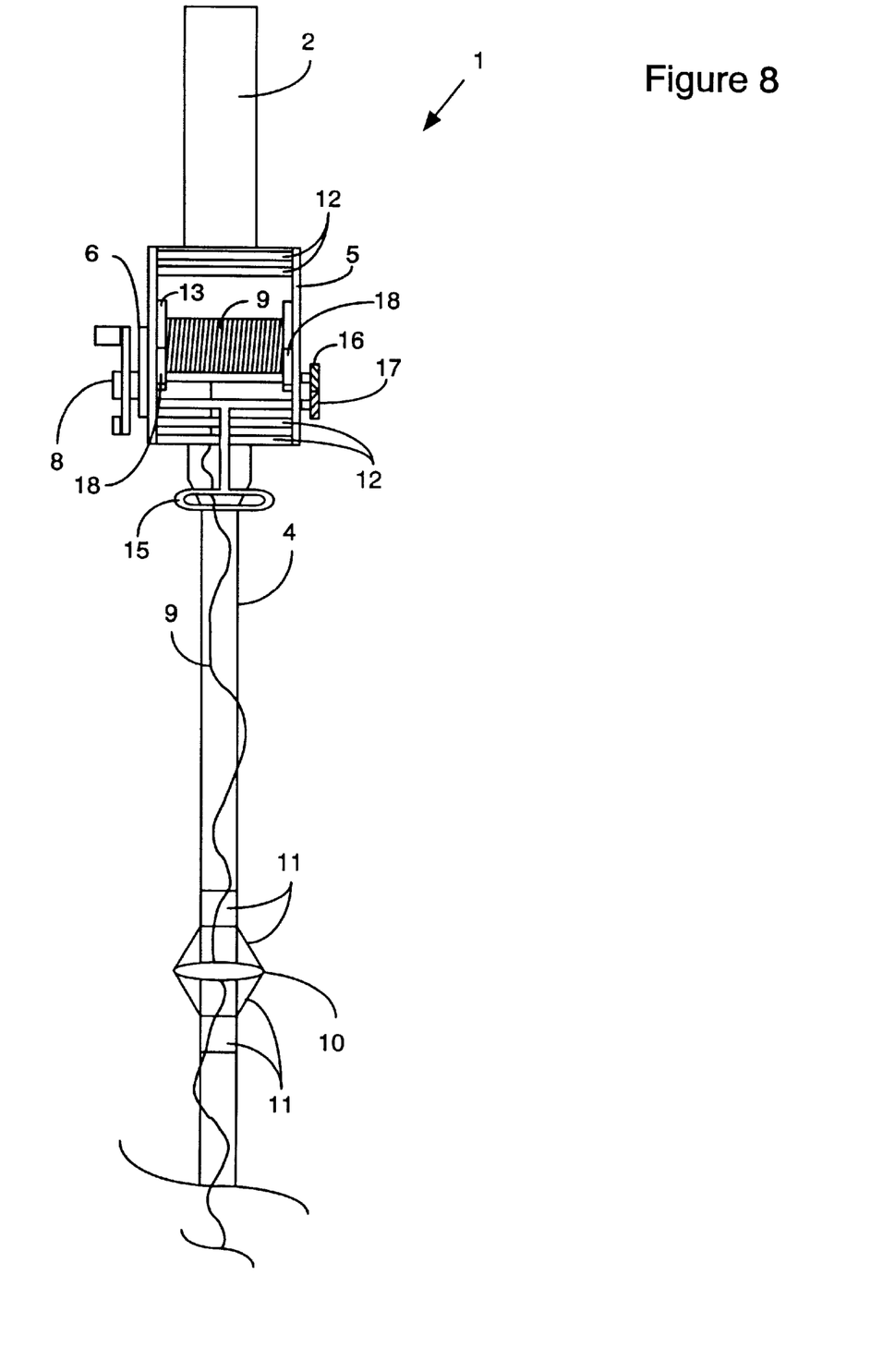
FIG. 8 is a top view of the preferred embodiment of FIG. 5 in which the fishing line extends from the fishing reel spool through a gravity controlled fishing line brake. The line in this figure is slack, but no bird's nest is formed.

FIG. 8 shows a top view of the embodiment of FIG. 7. In this figure, the fishing line 9 is shown as being slack after it has left the fishing reel. However, because the brake arm 15 has been pulled under the force of gravity toward flexible rod 4, the rotation of gears 16, 17 has forced brake pads 18 into contact with fishing reel spool 13. Once fishing reel spool 13 is braked by brake pads 18, the fishing reel spool 13 is prevented from spinning and the formation of a bird's nest 14 is prevented.

Figure 9:
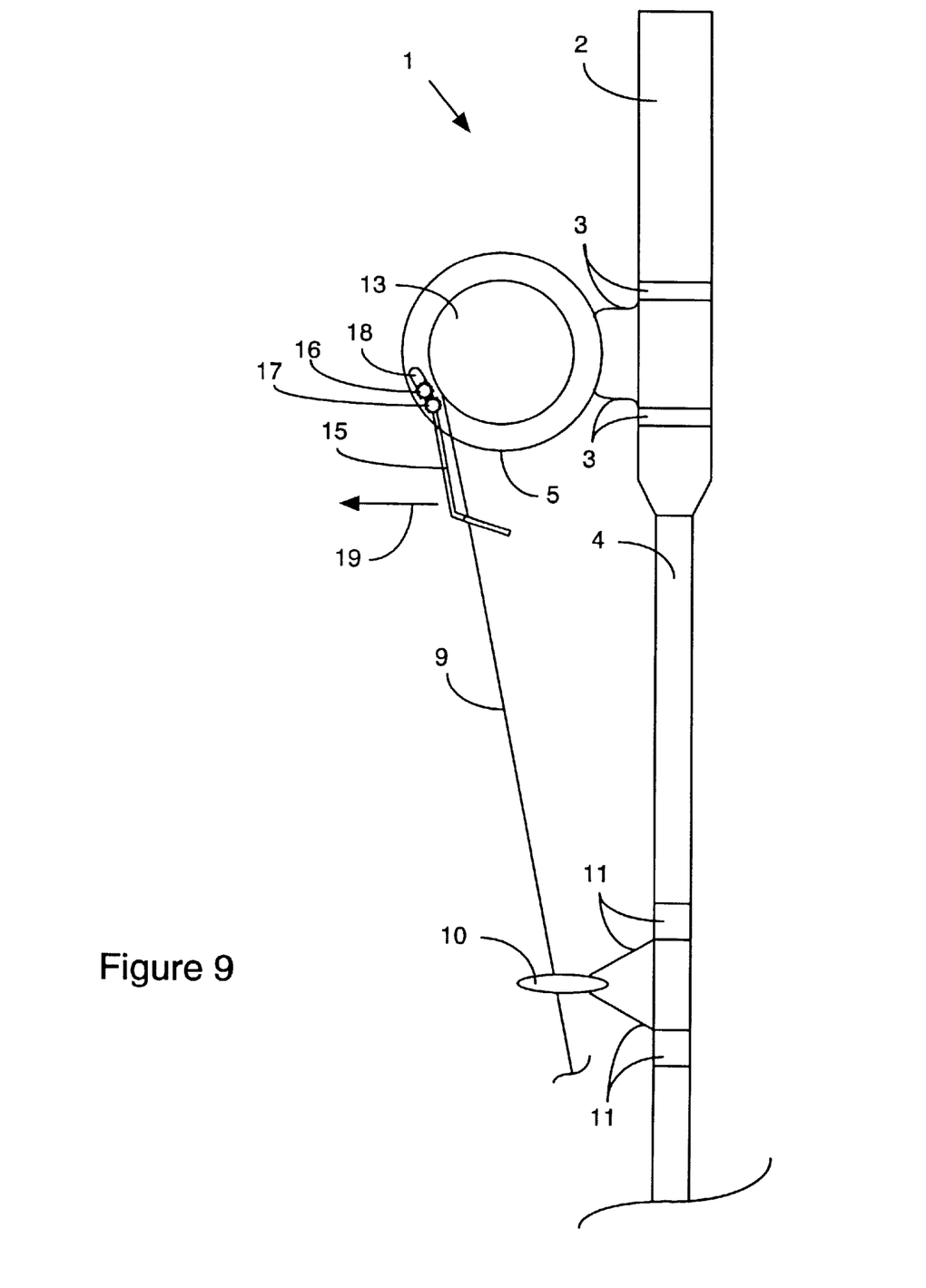
FIG. 9 is a side cutaway view of a preferred embodiment of the invention. This figure illustrates the fishing line which is under tension and extending from the fishing reel spool through the fishing line brake. The fishing line brake is disengaged by the fishing line tension in the brake pad is rotated away from the fishing reel spool.

FIG. 9 shows a cutaway side view of the embodiment of FIG. 6. In this view of the fishing line 9 is shown as being under tension. When under tension, the fishing line 9 raises the brake arm 15 in direction 19. This rotates gears 17 and 16 such that brake pad 18 is elevated above the surface of fishing reel spool 13. This allows fishing reel spool 13 to rotate freely.

Figure 10:
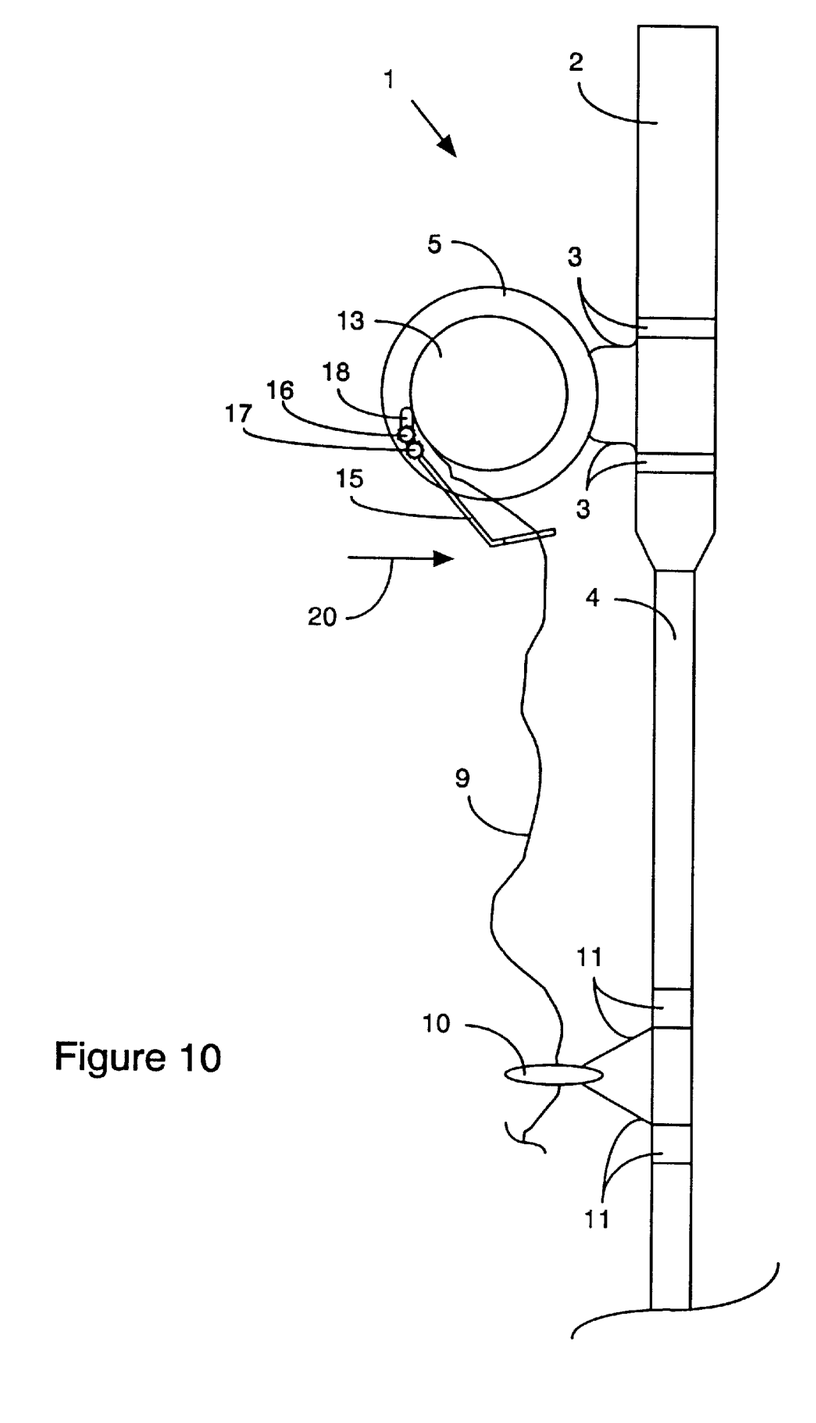
FIG. 10 is a side cutaway view of the preferred embodiment of FIG. 9 which illustrates the engagement of the brake against the fishing reel spool when the tension on the fishing line is removed.

FIG. 10 is a cutaway side view of the embodiment of FIG. 6, except that tension has been removed from fishing line 9. When tension is removed, gravity forces brake arm 15 in direction 20 which is toward flexible rod 4. As brake arm 15 moves toward flexible rod 4, gears 16 and 17 are rotated such that brake pad 18 is forced into contact with fishing reel spool 13. As noted above, this prevents any further spinning of fishing reel spool 13 and prevents the creation of a bird's nest.

Figure 11:
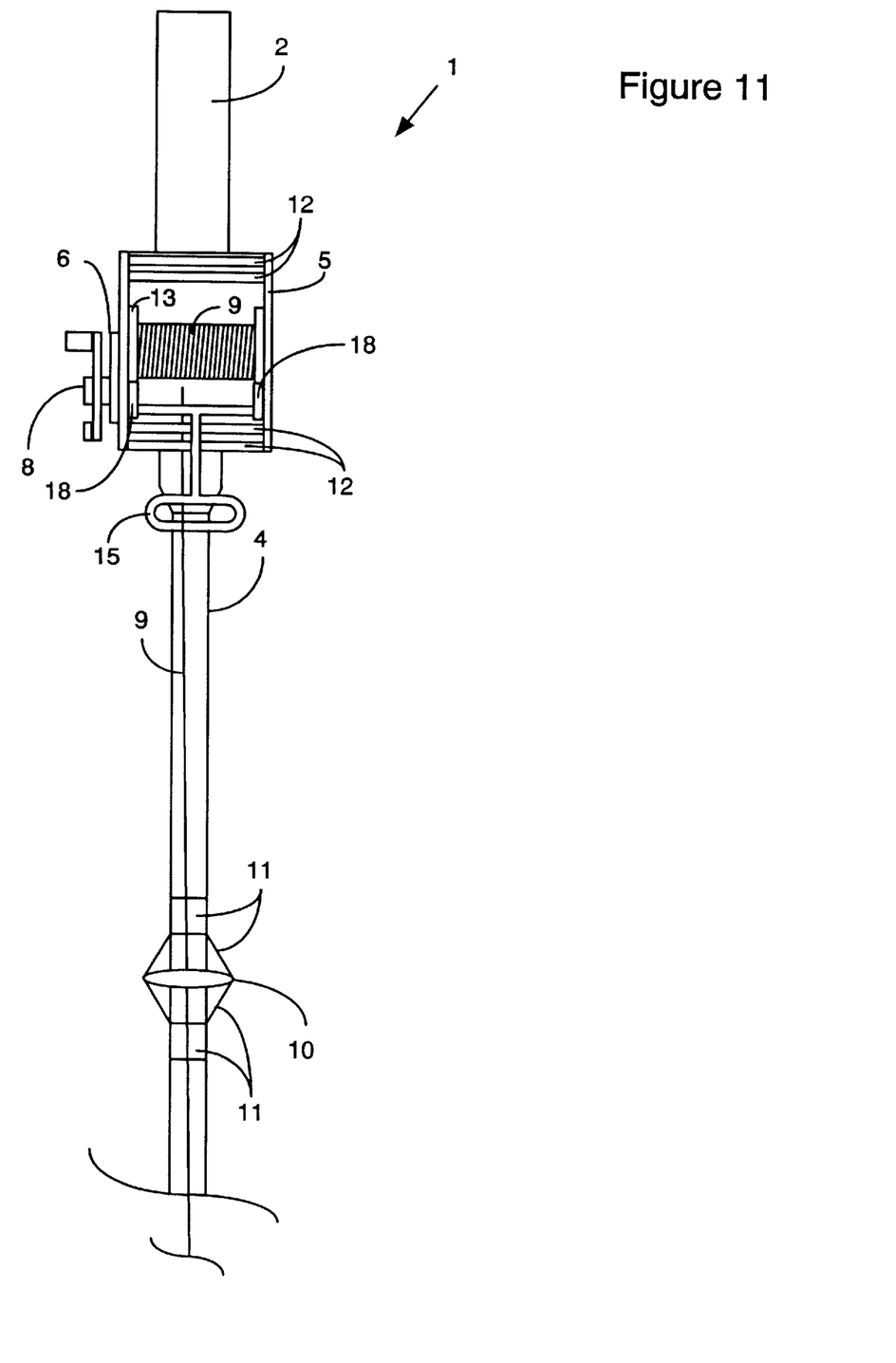
FIG. 11 is a top view of the preferred embodiment of FIG. 9 which illustrates the fishing line when it is under tension. The fishing line extends from the fishing reel spool through the fishing line brake. This figure also illustrates the brake pads used by the fishing line brake.

FIG. 11 is a top view of an alternative preferred embodiment in which gears 16 and 17 are eliminated and brake pad 18 is directly attached to brake arm 15. This provides a simplified construction. When tension is applied to fishing line 9, the brake pads 18 are raised above fishing reel spool 13 in the same manner as discussed above. Likewise, when tension is removed, brake arm 15 falls toward flexible rod 4 and causes brake pads 18 to come in contact with, and stop the rotation of, fishing reel spool 13.

Figure 12:
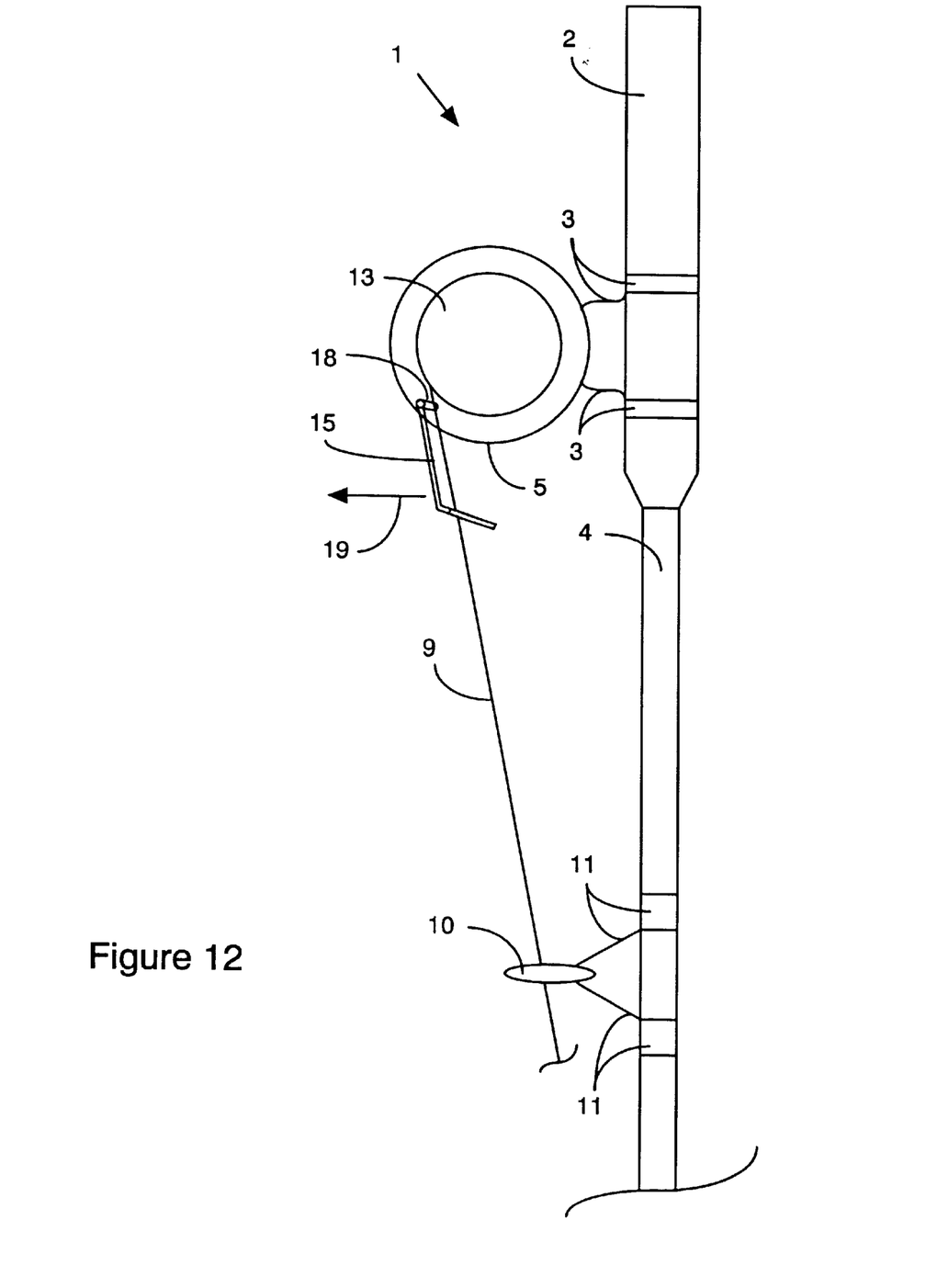
FIG. 12 is a side cutaway view of an alternative preferred embodiment in which the brake pad is directly attached to the brake arm. In this figure, the fishing line is shown under tension and the brake arm is disengaged.

FIG. 12 is a cutaway side view of the embodiment of FIG. 11. In this figure, tension on fishing line 9 causes brake arm 15 to move upward in direction 19. When this happens, brake arm 15 rotates brake pad 18 away from fishing reel spool 13 such that the fishing reel spool 13 can freely rotate.

Figure 13:
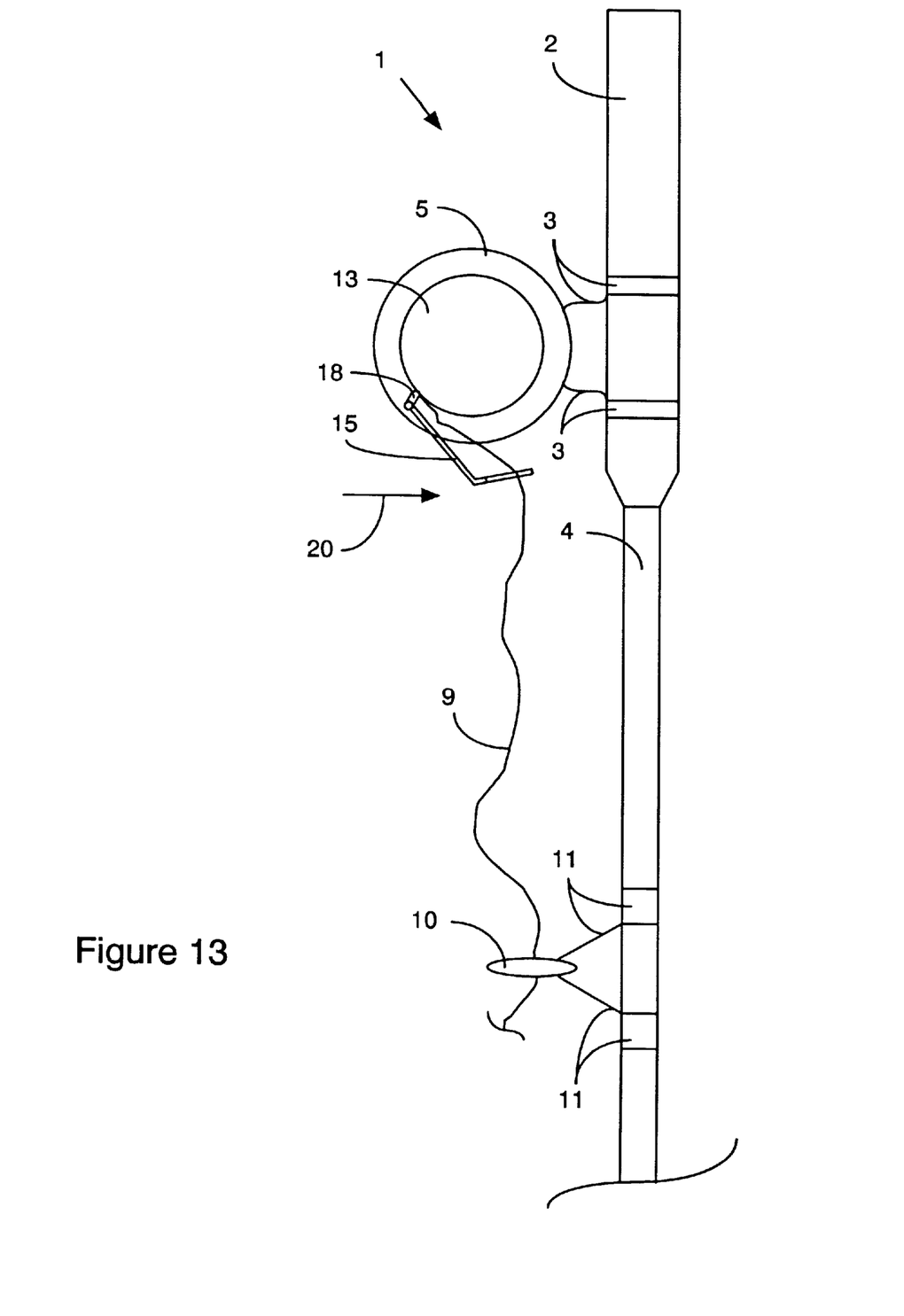
FIG. 13 is a side cutaway view of the alternative preferred embodiment of FIG. 12 in which the brake pad is fully engaged with the fishing reel spool. In this figure, the fishing line is slack.

FIG. 13 is a cutaway side view of the embodiment of FIG. 11 which illustrates the fishing line 9 in the slack configuration. If fishing line 9 goes slack, brake arm 15 is automatically forced by gravity in direction 20. As brake arm 15 rotates toward flexible rod 4, brake pad 18 is brought into contact with fishing reel spool 13 which causes fishing reel spool 13 to stop spinning.

Figure 14A:
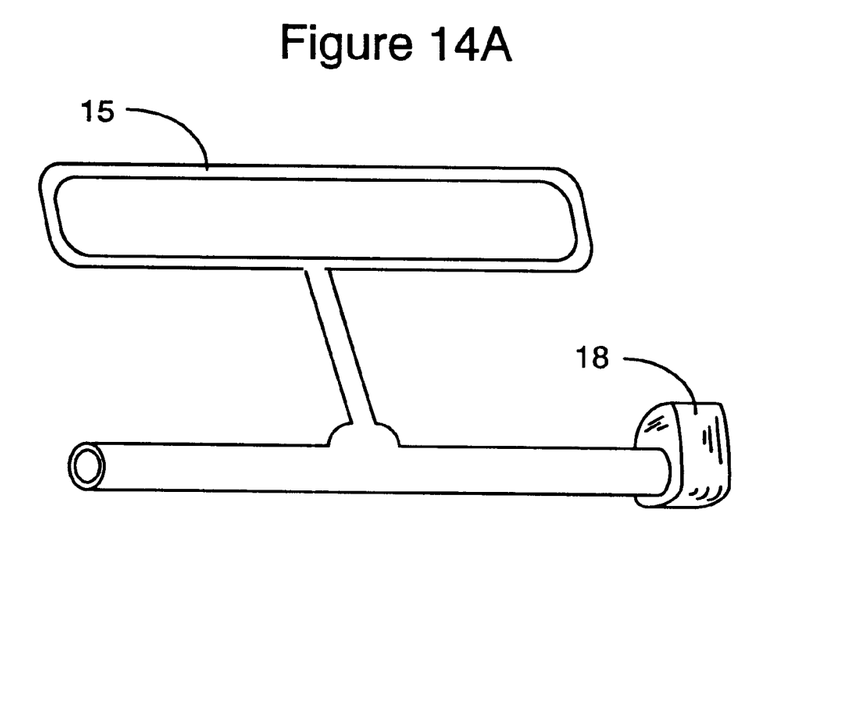
FIG. 14A is a perspective view of an alternative preferred embodiment of the brake arm in which the brake pad is directly attached to the brake arm.

FIG. 14A is another alternative preferred embodiment of brake arm 15 which illustrates the single brake pad 18 attached to the pivoting arm of brake arm 15. This can be seen from this figure, it is advantageous for the brake pad to be asymmetrically mounted on the pivoting arm of brake arm 15. In this configuration, the rotation of brake arm 15 can be used to alter the distance between brake pad 18 and fishing reel spool 13.

Figure 14B:
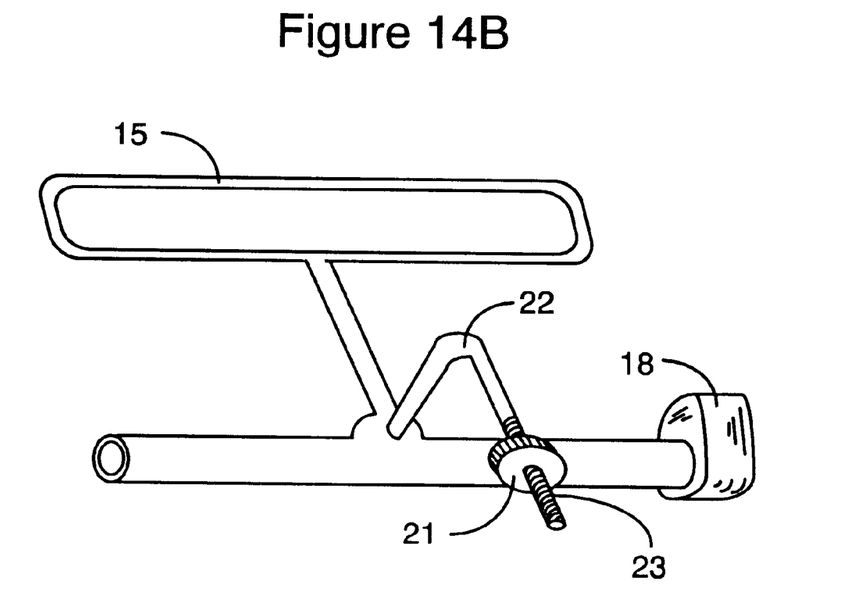
FIG. 14B is a perspective view of another alternative preferred embodiment of the brake arm. In this embodiment, an adjustable counter balance weight is attached to the brake arm to control the amount of force applied by the brake arm to the fishing reel spool.

FIG. 14B is another alternative preferred embodiment in which an adjustable weight 21 is attached to brake arm 15 to allow a fisherman to adjust how much tension is required to engage or release brake pads 18 from fishing reel spool 13. In this figure, adjustable weight 21 is shown threaded onto support rod 22 via threads 23. Those skilled in the art will recognize that any suitable weight adjustment means can be used, such as a sliding pressure fit weight, etc.

Figure 15:
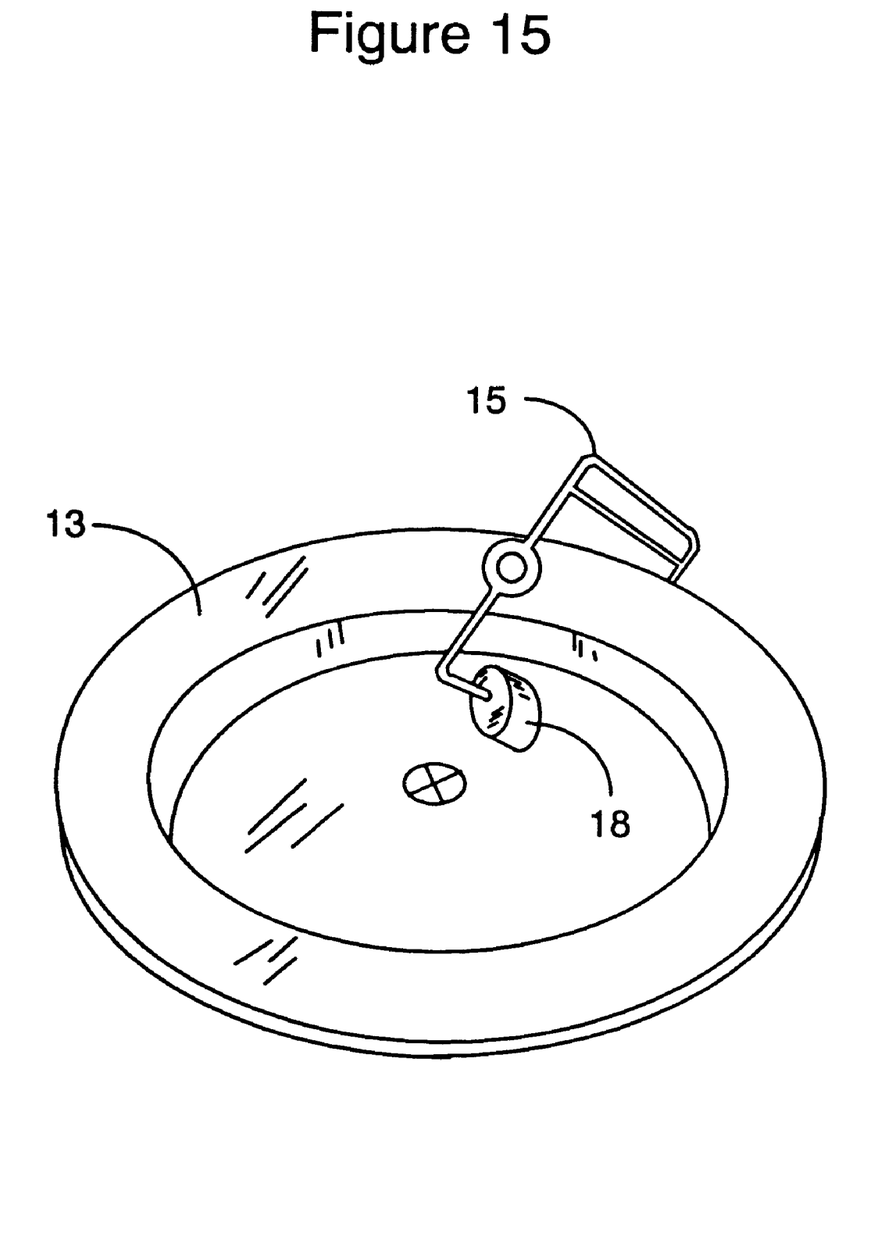
FIG. 15 is a perspective view of another alternative preferred embodiment. In this embodiment, the brake pad contacts the interior side of the fishing reel spool.

FIG. 15 is another alternative preferred embodiment in which the brake arm 15 has extensions that extend past the outside edges of the fishing reel spool 13 and allow the brake pads 18 to make contact with the fishing reel spool 13 on the opposite side of fishing reel spool 13. This configuration allows the brake pads 18 to eliminate any contact between fishing line 9 and brake pads 18. In addition, it also allows brake pad 18 to be concealed for cosmetic purposes which results in a more aesthetically pleasing brake arm 15.

Brake arm 15 can be fabricated from any suitable material. Likewise, brake pads 18 would be preferably fabricated from a material which would provide sufficient friction to stop fishing reel spool 13 from spinning. In addition, the materials selected should be suitable for use in environments where water is present. The weight distribution of brake arm 15 must be such that the brake arm 15 will fall downward toward flexible rod 4 when the fishing reel is above flexible rod 4 under the force of gravity.

Those skilled in the art will also recognize that brake arm 15 does not have to be in any particular shape. For example, it does not need to have an aperture through which the fishing line passes and may in fact be structured with an opening to allow the fishing line 9 to be inserted from the side etc. In addition, it may even be formed as an arc, curve, etc. with the bottom of the brake arm not restricting movement of the fishing line 9.

The fishing reel has been illustrated as a conventional fishing reel with enclosing side walls 5. However, the features and advantages of the invention can be implemented in any fishing reel with a rotatable fishing reel spool 13 which carries a supply of fishing line 9. For example, while the enclosing side walls 5 act as a fishing reel spool support assembly, they can be eliminated and replaced with a simple bracket capable of acting as a fishing reel spool support assembly to provide support for the fishing reel spool 13 and the brake arm 15.

While the invention has been described with respect to a preferred embodiment thereof, it will be understood by those skilled in the art that various changes in detail may be made therein without departing from the spirit, scope, and teaching of the invention. For example, the material used to construct the layers may be anything suitable for use in fishing environments, the size and shape of the brake arm can vary. The material used to fabricate the brake pad or the size of the brake pad can vary, etc. Accordingly, the invention herein disclosed is to be limited only as specified in the following claims.

I claim:

1. A fishing reel with an automatic gravity controlled fishing line brake, comprising:

a fishing reel spool support assembly;

a rotatable fishing reel spool movably attached to the fishing reel spool support assembly;

a brake arm movably attached to the fishing reel spool support assembly;

at least one brake pad attached to the brake arm, the at least one brake pad aligned such that, when the brake arm is moved to an unlocked position under tension by a fishing line, the at least one brake pad is moved away from contact with the rotatable fishing reel spool, and the at least one brake pad further aligned such that when the fishing line becomes slack, the brake arm is not under tension by fishing line, and the brake arm moves to a locked position such that the at least one brake pad is brought into contact with the rotatable fishing reel spool;

a primary gear attached to a proximal end of the brake arm, the primary gear attached such that when the brake arm is moved due to fishing line tension or fishing line slack, the primary gear rotates with the brake arm;

a secondary gear, enmeshed with the primary gear and secured to the fishing reel spool support assembly such that when the primary gear rotates, it causes the secondary gear to rotate; and the secondary gear further attached to the brake pad such that rotation of the secondary gear rotates the brake pad into contact with the fishing reel spool when the fishing line is slack and rotates the brake pad out of contact with the fishing reel spool when the fishing line is under tension;

whereby the fishing reel spool is prevented from rotating when in the locked position and is free to rotate when in the unlocked position.

2. A fishing reel brake, as in claim 1, wherein the brake arm further comprises:

the proximal end and a distal end, the proximal end having means to movably attach to the fishing reel spool support assembly, and the distal end having means to contact the fishing line;

distal end further positioned such that when the fishing line is under tension, the distal end is moved into an unlocked position by contact with the fishing line, and when the fishing line enclosed by the distal end is slack, the distal end falls under control gravity to a locked position.

3. A fishing reel brake, as in claim 2, wherein the at least one brake pad is secured to the proximal end of the brake arm.

4. A fishing reel brake, as in claim 3, wherein at least two brake pads are attached to the proximal end of the brake arm.

5. A fishing reel with an automatic gravity controlled fishing line brake, comprising:

a fishing reel spool support assembly having outside edges;

a rotatable fishing reel spool movably attached to the fishing reel spool support assembly;

a brake arm movably attached to the fishing reel spool support assembly, the brake arm having a proximal end and a distal end;

the proximal end of the brake arm assembly having brake pad extensions extending past the outside edges of the rotatable fishing reel spool and having at least one brake pad attached to the brake arm extensions;

the at least one brake pad aligned such that, when the brake arm is moved to an unlocked position under tension by a fishing line, the at least one brake pad is moved away from contact with the rotatable fishing reel spool, and the at least one brake pad further aligned such that when the fishing line becomes slack, the brake arm is not under tension by fishing line, and the brake arm moves to a locked position such that the at least one brake pad is brought into contact with the rotatable fishing reel spool;

a primary gear attached to the proximal end of the brake arm, the primary gear attached such that when the brake arm is moved due to fishing line tension or fishing line slack, the primary gear rotates with the brake arm;

a secondary gear, enmeshed with the primary gear and secured to the fishing reel spool support assembly such that when the primary gear rotates, it causes the secondary gear to rotate; and the secondary gear further attached to the brake pad such that rotation of the secondary gear rotates the brake pad into contact with the fishing reel spool when the fishing line is slack and rotates the brake pad out of contact with the fishing reel spool when the fishing line is under tension;

whereby the fishing reel spool is prevented from rotating when in the locked position and is free to rotate when in the unlocked position.

6. A fishing reel brake, as in claim 5, wherein the brake arm further comprises:

the proximal end having means to movably attach to the fishing reel spool support assembly, and the distal end having means to contact the fishing line;

distal end further positioned such that when the fishing line contacts the distal end under tension, the distal end is moved into an unlocked position by the fishing line, and when the fishing line is slack, the distal end falls under the control of gravity to a locked position.

7. A fishing reel brake, as in claim 6, wherein at least two brake pads are attached to the proximal end of the brake arm.

8. A method of automatically braking a fishing reel with a gravity controlled fishing line brake, including the steps of:

using a fishing reel spool support assembly to support a rotatable fishing reel spool movably;

movably attaching a brake arm to the fishing reel spool support assembly;

attaching at least one brake pad to the brake arm, the at least one brake pad aligned such that, when the brake arm is moved to an unlocked position under tension by a fishing line, the at least one brake pad is moved away from contact with the rotatable fishing reel spool, and the at least one brake pad further aligned such that when the fishing line becomes slack, the brake arm is not under tension by the fishing line, and the brake arm moves to a locked position such that the at least one brake pad is brought into contact with the rotatable fishing reel spool;

attaching a primary gear to a proximal end of the brake arm, the primary gear attached such that when the brake arm is moved due to fishing line tension or fishing line slack, the primary gear rotates with the brake arm;

enmeshing a secondary gear with the primary gear and securing it to the fishing reel spool support assembly such that when the primary gear rotates, it causes the secondary gear to rotate; and attaching the secondary gear further to the brake pad such that rotation of the secondary gear rotates the brake pad into contact with the fishing reel spool when the fishing line is slack and rotates the brake pad out of contact with the fishing reel spool when the fishing line is under tension;

whereby the fishing reel spool is prevented from rotating when in the locked position and is free to rotate when in the unlocked position.

9. A method, as in claim 8, including the additional steps of:

forming the brake arm with the proximal end and a distal end, the proximal end having means to movably attach to the fishing reel spool support assembly, and the distal end having means to contact a fishing line;

positioning the distal end such that when the fishing line is under tension, the distal end is moved into an unlocked position by contact with the fishing line, and when the fishing line is slack, the distal end falls under control gravity to a locked position.

10. A method, as in claim 9, including the additional step of securing at least one brake pad to the proximal end of the brake arm.

11. A method, as in claim 9, including the additional step of attaching at least two brake pads to the proximal end of the brake arm.

* * * * *